US010697812B2

(12) United States Patent
Mitsutake

(10) Patent No.: US 10,697,812 B2
(45) Date of Patent: Jun. 30, 2020

(54) ERROR DETECTION CIRCUIT AND ERROR DETECTION METHOD OF ELECTROMAGNETIC FLOW METER AND ELECTROMAGNETIC FLOW METER

(71) Applicant: Azbil Corporation, Tokyo (JP)

(72) Inventor: Ichiro Mitsutake, Tokyo (JP)

(73) Assignee: Azbil Corporation, Tokyo (JP)

( * ) Notice: Subject to any disclaimer, the term of this patent is extended or adjusted under 35 U.S.C. 154(b) by 200 days.

(21) Appl. No.: 16/119,129

(22) Filed: Aug. 31, 2018

(65) Prior Publication Data
US 2019/0078915 A1    Mar. 14, 2019

(30) Foreign Application Priority Data

Sep. 14, 2017   (JP) ................. 2017-176625

(51) Int. Cl.
*G01F 1/60*    (2006.01)
*G01F 1/58*    (2006.01)
*G01F 25/00*   (2006.01)

(52) U.S. Cl.
CPC ............... *G01F 1/60* (2013.01); *G01F 1/588* (2013.01); *G01F 25/0007* (2013.01)

(58) Field of Classification Search
CPC ..................................... G01F 1/60; G01F 1/58
See application file for complete search history.

(56) References Cited

U.S. PATENT DOCUMENTS 7,234,363 B2 *  6/2007  Kumpfmuller ....... G01F 1/8436
                                        73/861.357
7,921,734 B2 *  4/2011  Foss .................... G01F 25/0007
                                        324/509

(Continued)

FOREIGN PATENT DOCUMENTS

CN    103376136 A    10/2013
JP    H03-144314 A   6/1991

(Continued)

OTHER PUBLICATIONS

Korean Patent Office, "Office Action", issued in Korean Patent Application No. 10-2018-0103694, which is a KR counterpart of U.S. Appl. No. 16/119,129, dated Jan. 3, 2020, 11 pages (6 pages of English Translation of Office Action and 5 pages of Office Action).

(Continued)

*Primary Examiner* — Jewel V Dowtin
(74) *Attorney, Agent, or Firm* — Amster, Rothstein & Ebenstein LLP

(57)   ABSTRACT

An electromagnetic flow meter comprises a detector having a measurement tube, a magnetic excitation coil, and a pair of detecting electrodes; a magnetic excitation circuit; a flow rate calculation circuit that calculates the flow rate of a fluid flowing through the measurement tube; and an error detection circuit comprising a differential noise measurement circuit configured to measure a level of a magnetic flux differential noise based on an electromotive force generated between the pair of detecting electrodes disposed in the measurement tube and an index calculation circuit configured to calculate an index indicating an error in the flow rate calculated by the flow rate calculation circuit based on the level of the magnetic flux differential noise measured by the differential noise measurement circuit.

11 Claims, 6 Drawing Sheets

(56) References Cited

U.S. PATENT DOCUMENTS

| | | | |
|---|---|---|---|
| 8,739,636 B2 | 6/2014 | Mitsutake | |
| 9,651,411 B2 * | 5/2017 | Yamaguchi | G01F 1/588 |
| 9,683,878 B2 * | 6/2017 | Li | G01F 1/58 |
| 10,557,745 B2 * | 2/2020 | Shimura | G01F 25/0007 |
| 2007/0234820 A1 | 10/2007 | Yamamoto | |
| 2013/0289897 A1 | 10/2013 | Yamaguchi et al. | |

FOREIGN PATENT DOCUMENTS

| | | | |
|---|---|---|---|
| JP | H06-249675 A | 9/1994 | |
| JP | H09-126848 A | 5/1997 | |
| JP | 2707762 B2 | 2/1998 | |
| JP | 2001-281029 A | 10/2001 | |
| JP | 2005-351852 A | 12/2005 | |
| JP | 5444086 B2 | 3/2014 | |

OTHER PUBLICATIONS

The State Intellectual Property Office of People's Republic of China, "The First Office Action," issued in Chinese Patent Application No. 201811009946.9, which is a counterpart to U.S. Appl. No. 16/119,129, dated Mar. 3, 2020, 19 pages (11 pages of English Translation of Office Action and 8 pages of Original Office Action).

* cited by examiner

ERROR DETECTION CIRCUIT AND ERROR DETECTION METHOD OF ELECTROMAGNETIC FLOW METER AND ELECTROMAGNETIC FLOW METER

CROSS-REFERENCE TO RELATED APPLICATION

The present application claims the benefit of and priority to Japanese Patent Application No. 2017-176625, filed on Sep. 14, 2017, the entire contents of which are incorporated by reference herein.

TECHNICAL FIELD

The present invention relates to an error detection circuit and an error detection method of an electromagnetic flow meter and an electromagnetic flow meter, more particularly to an error detection circuit and an error detection method of an electromagnetic flow meter of a rectangular waveform magnetic excitation system having a non-magnetic excitation period between a positive magnetic excitation period and a negative magnetic excitation period and an electromagnetic flow meter of a rectangular waveform magnetic excitation system.

BACKGROUND

An electromagnetic flow meter includes a detector having a measurement tube, a magnetic excitation coil that generates a magnetic field orthogonal to a flow direction in the measurement tube, and a pair of detecting electrodes, disposed in the measurement tube, that face each other in a direction orthogonal to the flow direction of a fluid and the direction of the magnetic field. The electromagnetic flow meter supplies magnetic excitation current to the magnetic excitation coil and measures the flow rate of the fluid flowing through the measurement tube based on an electromotive force generated between the detecting electrodes when the fluid flows through the magnetic field generated by the magnetic excitation coil.

A rectangular waveform magnetic excitation system that switches the orientation of magnetic excitation current flowing through the magnetic excitation coil is used as one magnetic excitation system for an electromagnetic flow meter. In recent years, there are known techniques (PTL 1 and PTL 2) that reduce power consumption or known techniques (PTL 3 and PTL 4) that determine an abnormality such as emptiness of a measurement tube by adopting a so-called ternary magnetic excitation system that has a non-magnetic excitation period between a positive magnetic excitation period and a negative magnetic excitation period. In addition, there is another known technique that corrects error at the zero point of an output without setting the flow rate of a measurement target fluid to 0 (PTL 5).

CITATION LIST

Patent Literature

[PTL 1] JP-A-9-126848
[PTL 2] JP-A-2001-281029
[PTL 3] JP-A-3-144314
[PTL 4] Japanese Patent No. 5444086
[PTL 5] JP-A-2005-351852

SUMMARY

Generally, an electromagnetic flow meter is calibrated using tap water as a fluid to correct variations in a detector and then shipped.

As the range of application of electromagnetic flow meters is widened, such as application to chemical plants, the types of fluids to be measured are increased. When a measurement target fluid has conductivity and properties similar to those of water, the flow rate can be measured at precision similar to that during calibration before shipment. However, when the fluid has a high conductivity of hundreds of thousand of μS/cm, metal is melted in a medical agent, or the fluid is a surface-active agent having a high permittivity, then an electromotive force generated between a pair of detecting electrodes cannot be detected and the flow rate cannot be measured at good precision. In addition, when insulators are attached to the electrodes or conductive objects are attached between the inner surface of a lining in a measurement tube and a ground ring, an electromotive force between a pair of detecting electrodes cannot be detected and the flow rate cannot be measured at good precision. Accordingly, when the flow rate of a fluid other than the fluid (for example, water) used during calibration is measured, the precision of a flow meter in use may not be evaluated.

An object of the invention is to provide an error detection circuit and an error detection method of an electromagnetic flow meter and an electromagnetic flow meter that are capable of checking the precision of the electromagnetic flow meter in use.

According to the invention, there is provided an error detection circuit of an electromagnetic flow meter including a detector (1) that has a measurement tube (11), a magnetic excitation coil (14) that generates a magnetic field orthogonal to a longitudinal direction of the measurement tube, and a pair of detecting electrodes (12a and 12b) disposed in the measurement tube, the detecting electrodes facing each other in a direction orthogonal to a longitudinal direction of the measurement tube and a direction of the magnetic field, a magnetic excitation circuit (3) that periodically supplies magnetic excitation current to the magnetic excitation coil while changing a direction of the magnetic excitation current and providing a non-magnetic excitation period between a positive magnetic excitation period and a negative magnetic excitation period, and a flow rate calculation circuit (4) that calculates a flow rate of a fluid flowing through the measurement tube based on an electromotive force generated between the pair of detecting electrodes when the magnetic excitation current flows through the magnetic excitation coil, the error detection circuit comprising a differential noise measurement circuit (5) configured to measure a level of a magnetic flux differential noise from an electromotive force generated between the pair of detecting electrodes; and an index calculation circuit (6) configured to calculate an index indicating an error in the flow rate calculated by the flow rate calculation circuit of the electromagnetic flow meter based on the level of the magnetic flux differential noise measured by the differential noise measurement circuit.

In the error detection circuit of the electromagnetic flow meter according to the invention, the differential noise measurement circuit (5) may comprise an addition circuit (51) that adds voltages of the pair of detecting electrodes, a sampling circuit (54) that samples an output in a predetermined period at the beginning of the non-magnetic excitation period of an output of the addition circuit, and an A/D converter (55) that performs analog-to-digital conversion of an output of the sampling circuit, and the index calculation circuit (6) may comprise a memory (61) that stores the level of the magnetic flux differential noise during calibration of the electromagnetic flow meter, and a computation processing circuit (62) that calculates the index indicating the error in the flow rate calculated by the flow rate calculation circuit based on an output of the A/D converter and the level of the magnetic flux differential noise during calibration stored in the memory.

In the error detection circuit of the electromagnetic flow meter according to the invention, the sampling circuit (54) may sample the magnetic flux differential noise immediately after the positive magnetic excitation period switches to the non-magnetic excitation period and the magnetic flux differential noise immediately after the negative magnetic excitation period switches to the non-magnetic excitation period.

In addition, the sampling circuit (54*a*) may sample a difference between the magnetic flux differential noise immediately after the positive magnetic excitation period switches to the non-magnetic excitation period and a value to which the magnetic flux differential noise is recognized to converge and a difference between the magnetic flux differential noise immediately after the negative magnetic excitation period switches to the non-magnetic excitation period and a value to which the magnetic flux differential noise is recognized to converge.

The error detection circuit of the electromagnetic flow meter according to the invention may further comprise a sampling controlling circuit (23) that causes the sampling circuit to sample the magnetic flux differential noise immediately after the positive magnetic excitation period switches to the non-magnetic excitation period and the magnetic flux differential noise immediately after the negative magnetic excitation period switches to the non-magnetic excitation period.

In the error detection circuit of the electromagnetic flow meter according to the invention, the computation processing circuit (62) may calculate, as the index, the ratio of the output of the A/D converter (55) to the level of the magnetic flux differential noise during calibration stored in the memory (61).

The error detection circuit of the electromagnetic flow meter according to the invention may further comprise an output circuit (63) that outputs the index calculated by the index calculation circuit (6).

In addition, according to the invention, there is provided an electromagnetic flow meter comprising a detector (1) that has a measurement tube (11), a magnetic excitation coil (14) that generates a magnetic field orthogonal to a longitudinal direction of the measurement tube, and a pair of detecting electrodes (12*a* and 12*b*) disposed in the measurement tube, the detecting electrodes facing each other in a direction orthogonal to the longitudinal direction of the measurement tube and a direction of the magnetic field; a magnetic excitation circuit (3) that periodically supplies magnetic excitation current to the magnetic excitation coil while changing a direction of the magnetic excitation current and providing a non-magnetic excitation period between a positive magnetic excitation period and a negative magnetic excitation period; a flow rate calculation circuit (4) that calculates a flow rate of a fluid flowing through the measurement tube based on an electromotive force generated between the pair of detecting electrodes when the magnetic excitation current flows through the magnetic excitation coil; and an error detection circuit (5 and 6) configured to calculate an index indicating an error in the flow rate calculated by the flow rate calculation circuit of the electromagnetic flow meter based on the level of the magnetic flux differential noise measured from the electromotive force generated between the pair of detecting electrodes, in which the error detection circuit is any one of the error detection circuits of the electromagnetic flow meter.

The electromagnetic flow meter according to the invention may further comprise a correction circuit (9) that corrects the flow rate based on the index indicating the error in the flow rate calculated by the flow rate calculation circuit, the index being calculated by the index calculation circuit.

In addition, the electromagnetic flow meter according to the invention may further comprise a displaying portion (8) that displays the index indicating the error in the flow rate calculated by the flow rate calculation circuit.

According to the invention, there is provided an error detection method for an electromagnetic flow meter comprising a detector (1) that has a measurement tube (11), a magnetic excitation coil (14) that generates a magnetic field orthogonal to a longitudinal direction of the measurement tube, and a pair of detecting electrodes (12*a* and 12*b*) disposed in the measurement tube, the detecting electrodes facing each other in a direction orthogonal to the longitudinal direction of the measurement tube and a direction of the magnetic field, a magnetic excitation circuit (3) that periodically supplies magnetic excitation current to the magnetic excitation coil while changing a direction of the magnetic excitation current and providing a non-magnetic excitation period between a positive magnetic excitation period and a negative magnetic excitation period, and a flow rate calculation circuit (4) that calculates a flow rate of a fluid flowing through the measurement tube based on an electromotive force generated between the pair of detecting electrodes when the magnetic excitation current flows through the magnetic excitation coil, the error detection method comprising a differential noise measurement step of measuring a level of a magnetic flux differential noise comprised in an electromotive force generated between the pair of detecting electrodes; and an index calculation step of calculating an index indicating an error in the flow rate calculated by the flow rate calculation circuit of the electromagnetic flow meter based on the level of the magnetic flux differential noise measured in the differential noise measurement step.

Since the invention calculates the index indicating an error in the flow rate calculated by the flow rate calculation circuit of the electromagnetic flow meter based on the level of the magnetic flux differential noise comprised in the electromotive force generated between the pair of detecting electrodes, the precision of the flow meter in use can be checked.

DETAILED DESCRIPTION

Embodiments of the invention will be described below with reference to the drawings.

First Embodiment

The electromagnetic flow meter according to the first embodiment of the invention comprises an error detection circuit that calculates an index representing an error in a flow rate measured by the electromagnetic flow meter based on the level of a magnetic flux differential noise.

[Structure of the Electromagnetic Flow Meter]

Figure 1:
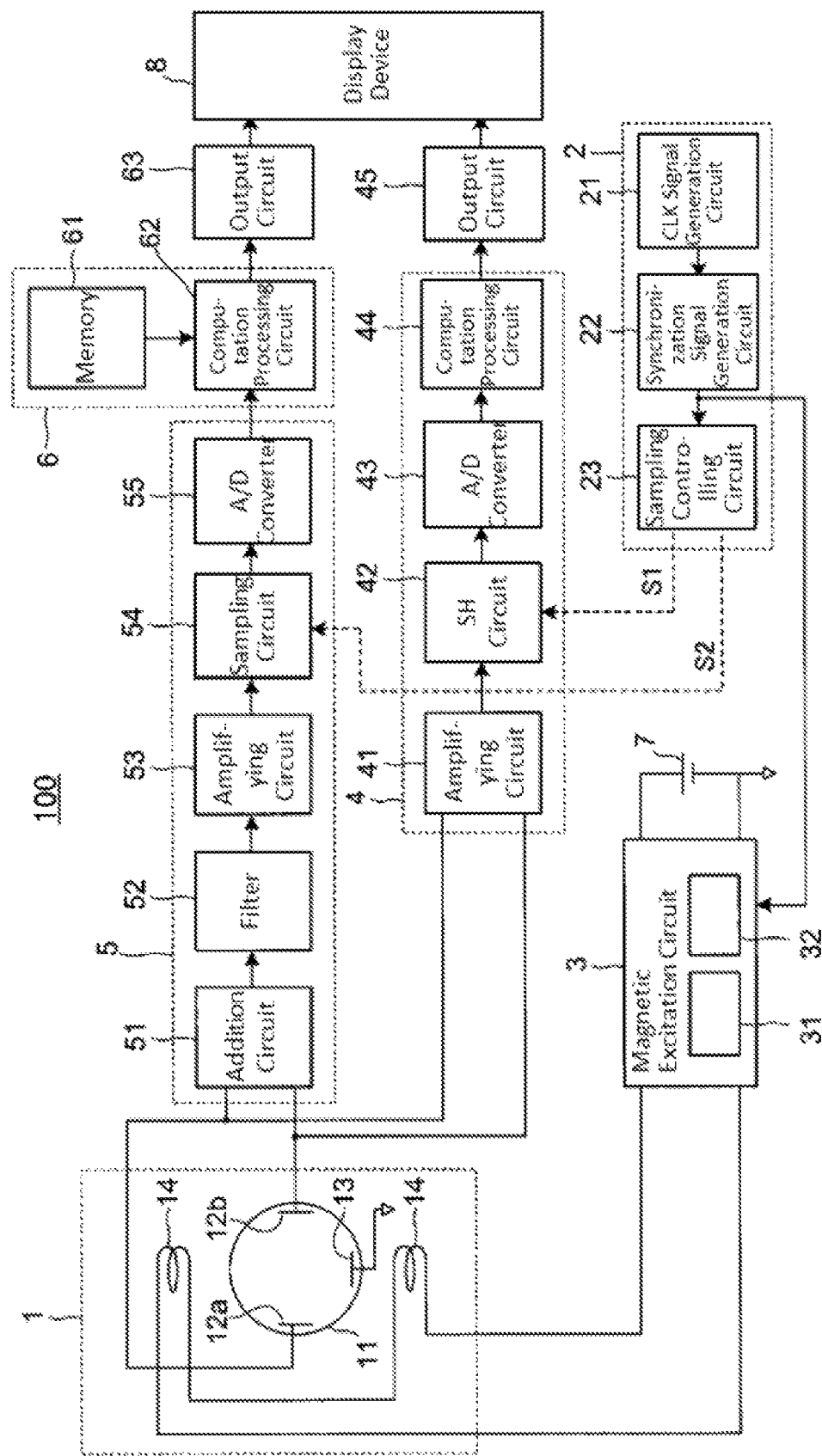
FIG. 1 illustrates the structure of an electromagnetic flow meter according to a first embodiment of the invention.

As illustrated in FIG. 1, an electromagnetic flow meter 100 according to the first embodiment of the invention comprises a detector 1, a synchronization circuit 2, a magnetic excitation circuit 3, a flow rate calculation circuit 4, a differential noise measurement circuit 5, an index calculation circuit 6, and a display device 8.

The detector 1 comprises a measurement tube 11, a magnetic excitation coil 14 that generates a magnetic field orthogonal to a longitudinal direction of the measurement tube 11, and a pair of detecting electrodes 12a and 12b, disposed in the measurement tube 11, that face each other in a direction orthogonal to the longitudinal direction of the measurement tube 11 and the direction of the magnetic field.

Here, the measurement tube 11 is a tubular member made of an insulating material. The measurement tube 11 is connected to a pipe of a plant or the like and a fluid flows therethrough in the longitudinal direction. The measurement tube 11 is provided with a ground ring 13. The ground ring 13 is connected to a reference voltage (for example, the ground (GND) level) for measurement of the voltages of the pair of detecting electrodes 12a and 12b.

The synchronization circuit 2 comprises a CLK signal generation circuit 21 that generates a clock (CLK) signal with a predetermined frequency, a synchronization signal generation circuit 22 that generates a synchronization signal by dividing the frequency of the CLK signal, and a sampling controlling circuit 23 that controls the operation of a sample holding (SH) circuit 42 and a sampling circuit 54, which will be described later, based on the synchronization signal.

The magnetic excitation circuit 3 is a circuit that receives electric power from a power supply 7 and supplies magnetic excitation current to the magnetic excitation coil 14 of the detector 1 based on the synchronization signal output from the synchronization signal generation circuit 22. The magnetic excitation circuit 3 comprises a voltage regulating circuit 31 that regulates a current value supplied to the magnetic excitation coil 14 by changing a voltage to be applied to the magnetic excitation coil 14 of the detector 1 and a magnetic excitation current direction switching circuit 32 that switches the orientation of a magnetic excitation current flowing through the magnetic excitation coil 14. The magnetic excitation circuit 3 supplies a magnetic excitation current that periodically changes to the magnetic excitation coil 14 of the detector 1 using a so-called "ternary magnetic excitation system" that has a non-magnetic excitation period for which the magnetic excitation current is not supplied between a positive magnetic excitation period and a negative magnetic excitation period by changing the direction of the magnetic excitation current, as described later.

It should be noted here that the power supply 7 for supplying electric power to the magnetic excitation circuit 3 may be a power supply circuit that generates a DC voltage from a commercial power source or may be a battery.

The flow rate calculation circuit 4 is a circuit that calculates the flow rate of the fluid flowing through the measurement tube 11 based on an electromotive force generated between the pair of detecting electrodes 12a and 12b of the detector 1 when magnetic excitation current flows through the magnetic excitation coil 14. In the embodiment, the flow rate calculation circuit 4 comprises an amplifying circuit 41 that amplifies the potential difference generated between the detecting electrodes 12a and 12b, the sample holding circuit 42 that samples a signal amplified by the amplifying circuit 41 and holds the value for a certain period based on a first control signal (sample holding control signal) S1 from the sampling controlling circuit 23, an A/D converter 43 that performs analog-to-digital conversion of the signal sampled and held, and a computation processing circuit 44 that calculates the flow rate based on a digital signal resulting from conversion.

Here, the computation processing circuit 44 obtains the average flow rate of the fluid flowing through the measurement tube 11 based on the density of a magnetic flux exited by the magnetic excitation coil 14 and penetrating through the fluid flowing through the measurement tube 11, the level of the sampled and held signal that corresponds to the electromotive force between the pair of detecting electrodes 12a and 12b at that time, the inner diameter of the measurement tube 11, and the conductivity of the fluid, calculates the flow rate by multiplying this average flow rate by the cross-sectional area of a flow channel in the measurement tube 11, and outputs the flow rate as a flow rate signal.

The computation processing circuit 44 as described above may comprise, for example, a microprocessor and a program that controls the operation of the microprocessor.

The flow rate calculated by the computation processing circuit 44 is output to a predetermined device (for example, the display device 8) via an output circuit 45 or output to a controller or central monitoring device, which are not illustrated, via a network and is used for display or other processing.

It should be noted here that the display device 8 is a display device, such as a liquid crystal display device, provided in the electromagnetic flow meter 100, but the display device 8 may be a monitor of a mobile terminal device to be connected to the electromagnetic flow meter 100 by workers, or the like, in the field.

The differential noise measurement circuit 5 and the index calculation circuit 6 constitute an error detection circuit that calculates an index indicating an error in the flow rate measured by the electromagnetic flow meter based on the level of a magnetic flux differential noise.

Of them, the differential noise measurement circuit 5 is a circuit that measures the level of a magnetic flux differential noise included in an electromotive force generated between the pair of detecting electrodes 12a and 12b. Here, the "magnetic flux differential noise" is a voltage generated when a closed circuit substantially formed by a conductive measurement target fluid, the detecting electrodes 12a and 12b, and a signal line (not illustrated) connecting these detecting electrodes to the amplifying circuit 41 or an addition circuit 51 is interlinked with a magnetic flux caused by the magnetic excitation coil 14 and this magnetic flux changes, and the magnetic flux differential noise is not related to a signal electromotive force by a flow of a fluid.

In the embodiment, the differential noise measurement circuit 5 comprises the addition circuit 51 that adds the voltages of the pair of detecting electrodes 12a and 12b, a filter 52 that removes the noise other than the magnetic flux differential noise from a signal output from the addition circuit 51, an amplifying circuit 53 that amplifies an output of the filter 52, the sampling circuit 54 that samples a signal output from the amplifying circuit 53 and performs conversion to direct current based on a second control signal (sampling control signal) S2 from the sampling controlling circuit 23, and an A/D converter 55 that converts an output of the sampling circuit 54 to a digital signal.

The addition circuit 51 receives the voltages between the ground ring 13 having been grounded and the detecting electrodes 12a and 12b and adds these voltages. Since the addition circuit 51 adds two voltage signals, noises are also added in an output of the addition circuit 51. Accordingly, the output signal of the addition circuit 51 undergoes noise removal by the filter 52, amplified by the amplifying circuit 53, and then input to the sampling circuit 54.

As described later, the sampling circuit 54 samples the output of the amplifying circuit 53 for a certain period immediately after the non-magnetic excitation period is reached because magnetic excitation current is turned off based on the second control signal (sampling control signal) S2 from the sampling controlling circuit 23. Sampling for the predetermined period immediately after the non-magnetic excitation period is reached as described above and is equivalent to "sampling of the magnetic flux differential noise immediately after switching to the non-magnetic excitation period" in the invention. The magnetic flux differential noise extracted as described above is converted to a digital signal by the A/D converter 55 and then input to the index calculation circuit 6 in a subsequent stage.

The index calculation circuit 6 is configured to calculate an index indicating an error in the flow rate calculated by the flow rate calculation circuit 4 of the electromagnetic flow meter 100 based on the level of the magnetic flux differential noise measured by the differential noise measurement circuit 5 described above. In the embodiment, the index calculation circuit 6 comprises a memory 61 and a computation processing circuit 62.

The memory 61 stores, in advance, the level of the magnetic flux differential noise measured when the electromagnetic flow meter 100 has been calibrated. The computation processing circuit 62 calculates an index indicating an error in the flow rate calculated by the flow rate calculation circuit 4 based on the output of the A/D converter 55 of the differential noise measurement circuit 5 and the level of the magnetic flux differential noise during calibration stored in the memory 61. The computation processing circuit 62 may compute, for example, the ratio between the level of the magnetic flux differential noise output from the A/D converter 55 during flow rate measurement and the level of the magnetic flux differential noise during calibration and may output the result as an index indicating an error in the flow rate calculated by the flow rate calculation circuit 4. In addition, the computation processing circuit 62 may calculate the time average by totalizing the outputs of the A/D converter 55 as the level of the magnetic flux differential noise output from the A/D converter 55 or calculate the time average by totalizing the absolute values of the outputs of the A/D converter 55.

The computation processing circuit 62 described above may comprise, for example, a microprocessor and a program that controls the operation of the microprocessor, as in the computation processing circuit 44 described above.

The electromagnetic flow meter 100 according to the embodiment further comprises an output circuit 63 that outputs an index calculated by the index calculation circuit 6, in a subsequent stage of the index calculation circuit 6. The index calculated by the index calculation circuit 6 is output to the display device 8 via the output circuit 63 and the value thereof is displayed in the display device 8. In addition, if the output circuit 63 is a network I/F circuit, it is possible to output the index to a predetermined device such as, for example, a controller or a central monitoring device, which are not illustrated, via a network and use the index for display or other processing.

[Operation of the Electromagnetic Flow Meter]

Next, the operation of the electromagnetic flow meter 100 according to the embodiment will be described.

To measure the flow rate of the fluid flowing through the measurement tube 11, magnetic excitation current is first supplied from the magnetic excitation circuit 3 to the magnetic excitation coil 14. Based on the synchronization signal from the synchronization signal generation circuit 22, the magnetic excitation circuit 3 supplies the magnetic excitation current to the magnetic excitation coil 14 by periodically switching the direction in which magnetic excitation current flows while sandwiching the non-magnetic excitation period for which no magnetic excitation current is supplied. That is, the magnetic excitation circuit 3 applies the voltage to the magnetic excitation coil 14 so that the "positive magnetic excitation period" for which magnetic excitation current flows in one direction and the "negative magnetic excitation period" for which magnetic excitation current flows in the other direction appear alternately while sandwiching "non-magnetic excitation period" for which magnetic excitation current is not supplied therebetween, as illustrated in FIG. 2 (a).

The magnetic excitation coil 14 generates a magnetic field by receiving magnetic excitation current from the magnetic excitation circuit 3. Since a back electromotive force proportional to the time differentiation of the magnetic excitation current is generated between the terminals of the magnetic excitation coil 14 when the magnetic excitation current flows through the magnetic excitation coil 14, a time delay occurs until the level of the magnetic flux density corresponding to the level of the magnetic excitation current in the steady state is reached (that is, the steady state is reached) in the level of the magnetic excitation current flowing through the magnetic excitation coil 14 (eventually the level of the magnetic flux density generated by the magnetic excitation coil 14), as illustrated in FIG. 2 (b). As a result, the magnetic flux differential noise is generated at the beginning of each of the positive magnetic excitation period, the non-magnetic excitation period, and the negative magnetic excitation period, as illustrated in FIG. 2 (c).

Figure 2:
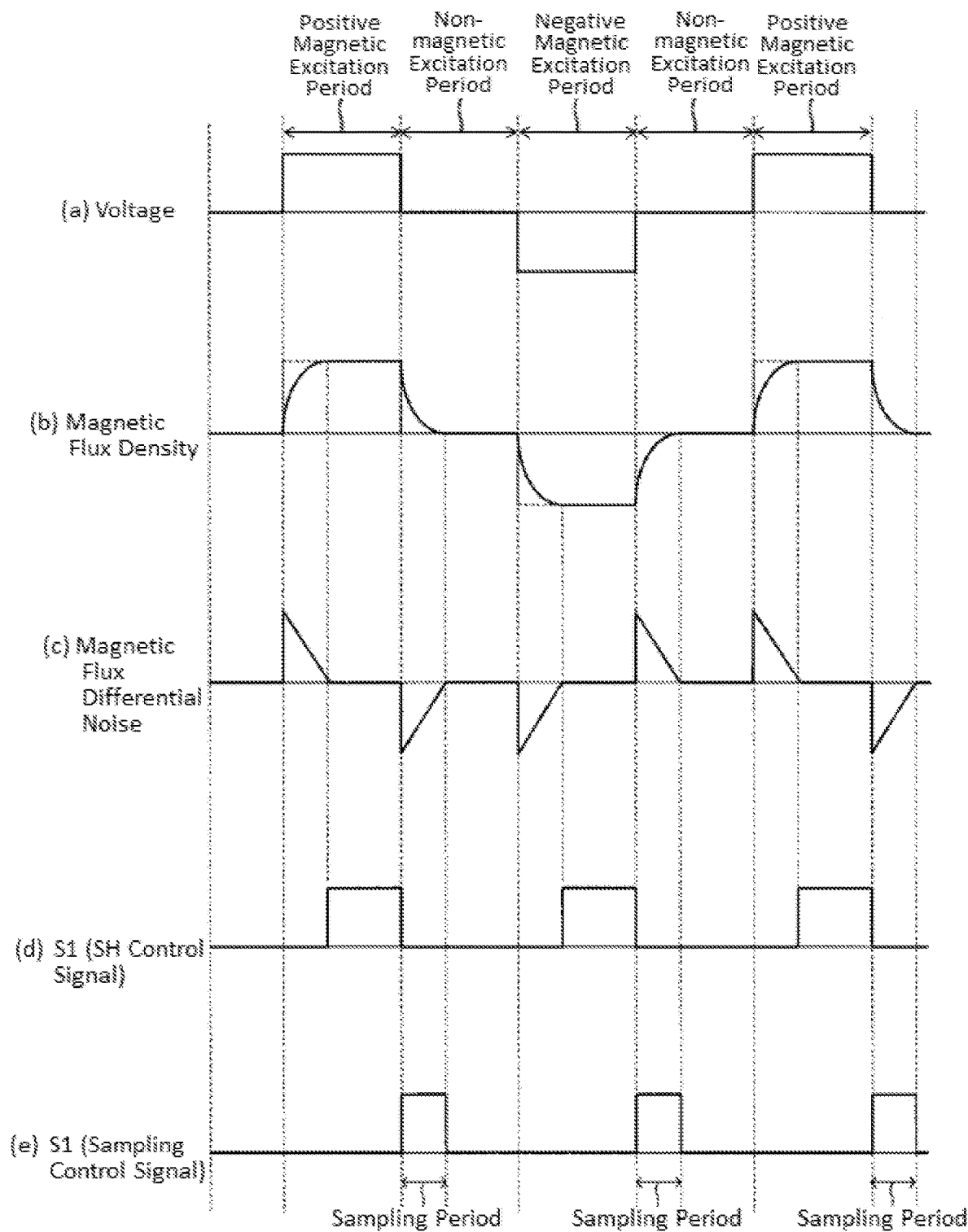
FIG. 2 is a timing chart used to describe the operation of the electromagnetic flow meter according to the first embodiment.

Accordingly, the flow rate calculation circuit 4 amplifies the voltage signals generated in the detecting electrodes 12a and 12b using the amplifying circuit 41, samples and holds the signals at a timing at which the magnetic flux is in the steady state, as illustrated in FIG. 2 (d), based on the first control signal (sample holding control signal) S1 from the sampling controlling circuit 23, calculates the flow rate based on this value, and outputs the flow rate as the flow rate signal.

On the other hand, the differential noise measurement circuit 5 measures the magnetic flux differential noise generated when the magnetic flux density changes temporally. In the embodiment, the differential noise measurement circuit 5 samples the output of the addition circuit 51 obtained by adding the voltages generated in the detecting electrodes 12a and 12b for the predetermined period immediately after the non-magnetic excitation period is reached because the magnetic excitation current is turned off, as illustrated in FIG. 2 (e), based on the second control signal S2 from the sampling controlling circuit 23. In this specification, the period for which sampling is performed is referred to as a "sampling period". By performing sampling only for the predetermined sampling period immediately after the non-magnetic excitation period is reached, only the magnetic flux differential noise can be extracted while the effect of the differential noise of magnetic excitation current is eliminated. The sampling period up to the non-magnetic excitation period only needs to be determined in advance so that magnetic flux differential noise can be measured.

The magnetic flux differential noise extracted as described above is converted to a digital signal by the A/D converter 55, the ratio between the level of this noise and the level of the magnetic flux differential noise during calibration is calculated by the index calculation circuit 6, and this value is output as an index indicating an error in the flow rate calculated by the flow rate calculation circuit 4 of the electromagnetic flow meter 100 from the output circuit 63. This index is displayed in the display device 8.

Here, the relationship between the value of the flow rate calculated by the flow rate calculation circuit 4 and the level of the magnetic flux differential noise measured by the differential noise measurement circuit 5 will be considered.

Figure 3:
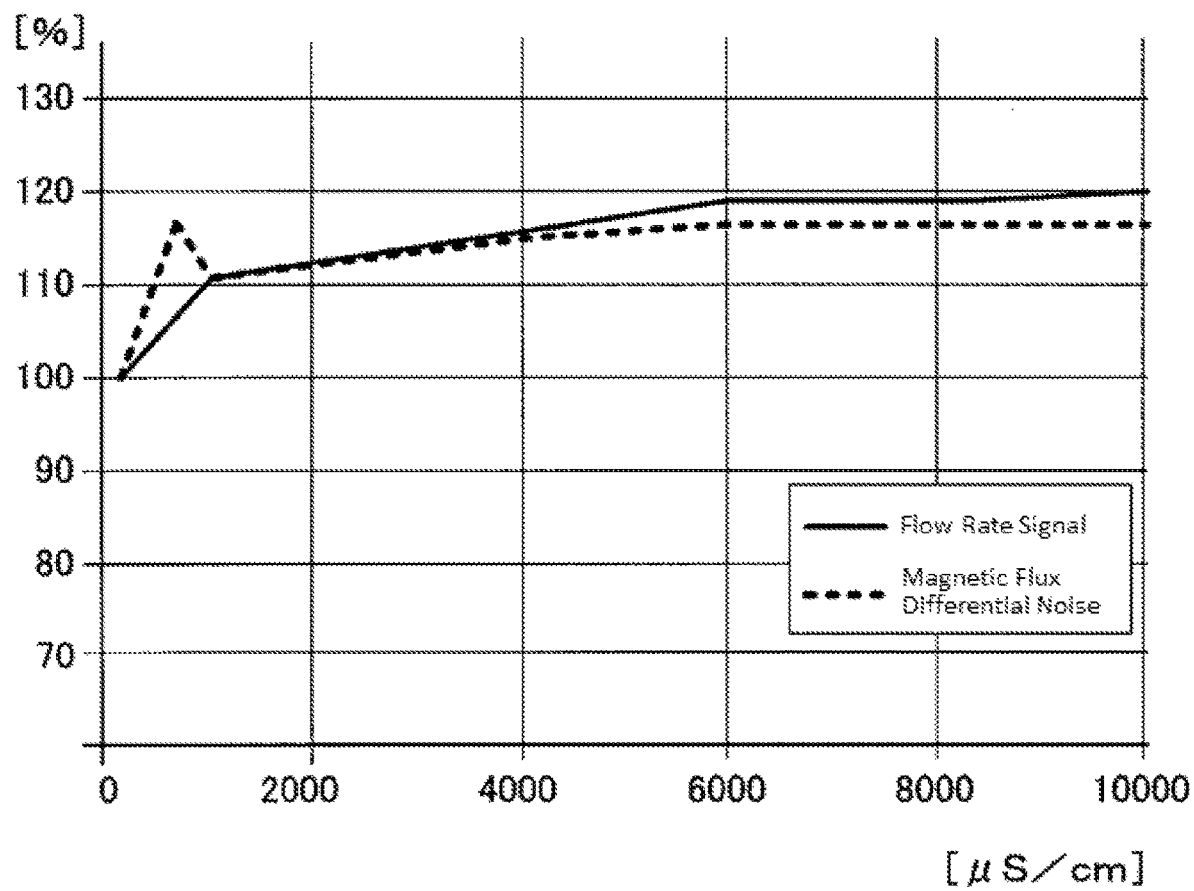
FIG. 3 is a graph illustrating changes in a magnetic flux differential noise and a flow rate signal with respect to the conductivity of a fluid.

In FIG. 3, the horizontal axis represents the conductivity ($\mu$S/cm) of the fluid flowing through the measurement tube 11 and the vertical axis represents the ratio (percentage) of the magnitude of the flow rate signal and the ratio (percentage) of the magnitude of the magnetic flux differential noise, when the magnitudes thereof in the case where the flow rate of tap water (with a conductivity of 150 $\mu$S/cm) is measured are assumed to be 100. The solid line represents the ratio between the magnitude of the flow rate signal when tap water flows and the magnitude of the flow rate signal when a fluid having a different conductivity flows at the same flow rate as in tap water and the dashed line represents the ratio between the magnitude of magnetic flux differential noise when tap water flows and the magnitude of magnetic flux differential noise when a fluid having a different conductivity flows at the same flow rate as in tap water.

As illustrated in FIG. 3, in a region in which the conductivities are large, the flow rate signal and the magnetic flux differential noise change similarly with respect to change in the conductivity of the measurement target fluid. Accordingly, by comparing the level of the magnetic flux differential noise measured by the differential noise measurement circuit 5 with the level of the magnetic flux differential noise measured during calibration as described in the embodiment, an index indicating an error in the flow rate calculated by the flow rate calculation circuit 4 can be obtained.

For example, when the flow rate of a fluid having conductivity and properties different from those of water is measured in, for example, a chemical plant or the like, users in the field can know that the precision of the electromagnetic flow meter in use is sufficient with reference to this index.

In addition, reduction in the precision of an electromagnetic flow meter due to the following causes can be detected with reference to the index described above.

(a) Attachment of insulating adherents, such as red rust, to the detecting electrodes or the like (b) Attachment of conductive adherents, such as stem rust, to the detecting electrodes or the like (c) Case where the measurement target fluid is a metal fluid (for example, copper sulfate) or a highly conductive fluid (d) Reduction in a magnetic force due to rust of the core of a magnetic excitation coil caused by condensation or the like (e) Shift due to mixture of iron powder with a fluid As described above, the precision of the electromagnetic flow meter in use can be checked in the field in which the electromagnetic flow meter is used by calculating the index indicating error in the flow rate calculated by the flow rate calculation circuit 4 based on the level of the magnetic flux differential noise measured by the differential noise measurement circuit 5 as an index indicating error in the flow rate and displaying this index in the display device 8.

At this time, the display device 8 may display the level of the magnetic flux differential noise measured by the differential noise measurement circuit 5 during flow rate measurement as the ratio (%) to the level of the magnetic flux differential noise during calibration stored in the memory 61 or may display an alarm stating that the level of the magnetic flux differential noise measured by the differential noise measurement circuit 5 during measurement of the flow rate has changed beyond a predetermined range (for example, ±3%) with respect to the level of the magnetic flux differential noise during calibration stored in the memory 61.

In addition, the precision of an electromagnetic flow meter in use can be monitored by outputting and displaying this index in a central monitoring device or the like via a network.

It should be noted here that, when the level of the magnetic flux differential noise during calibration of the electromagnetic flow meter using a reference fluid (for example, tap water) is stored in the memory 61, the level of the magnetic flux differential noise with respect to a typical flow rate of tap water may be stored or a plurality of levels of the magnetic flux differential noise measured for a plurality of flow rates of tap water may be associated with the values of the flow rates and then stored.

When the plurality of levels of the magnetic flux differential noise measured for the plurality of flow rates of tap water are associated with the values of the flow rates and then stored in the memory 61, the computation processing circuit 62 of the index calculation circuit 6 may calculate the index indicating error in the flow rate by referencing the value of the flow rate calculated by the flow rate calculation circuit 4, for example, by using the level of the magnetic flux differential noise associated with the flow rate closest to the value of the flow rate.

In addition, the embodiment calculates the index indicating error in the flow rate as the ratio between the level of the magnetic flux differential noise measured by the differential noise measurement circuit 5 and the level of the magnetic flux differential noise measured during calibration stored in the memory 61. However, the index indicating error in the flow rate is not limited to this index and may be, for example, the difference between the level of the magnetic flux differential noise measured by the differential noise measurement circuit 5 and the level of the magnetic flux differential noise measured during calibration or the ratio between the difference of the levels as described above and the level of the magnetic flux differential noise measured during calibration.

Second Embodiment

Next, the electromagnetic flow meter according to the second embodiment of the invention will be described with reference to FIG. 4. It should be noted here that the same components of the electromagnetic flow meter according to the second embodiment as in the electromagnetic flow meter according to the first embodiment are given the same reference numerals and duplicative detailed descriptions are omitted.

Figure 4:
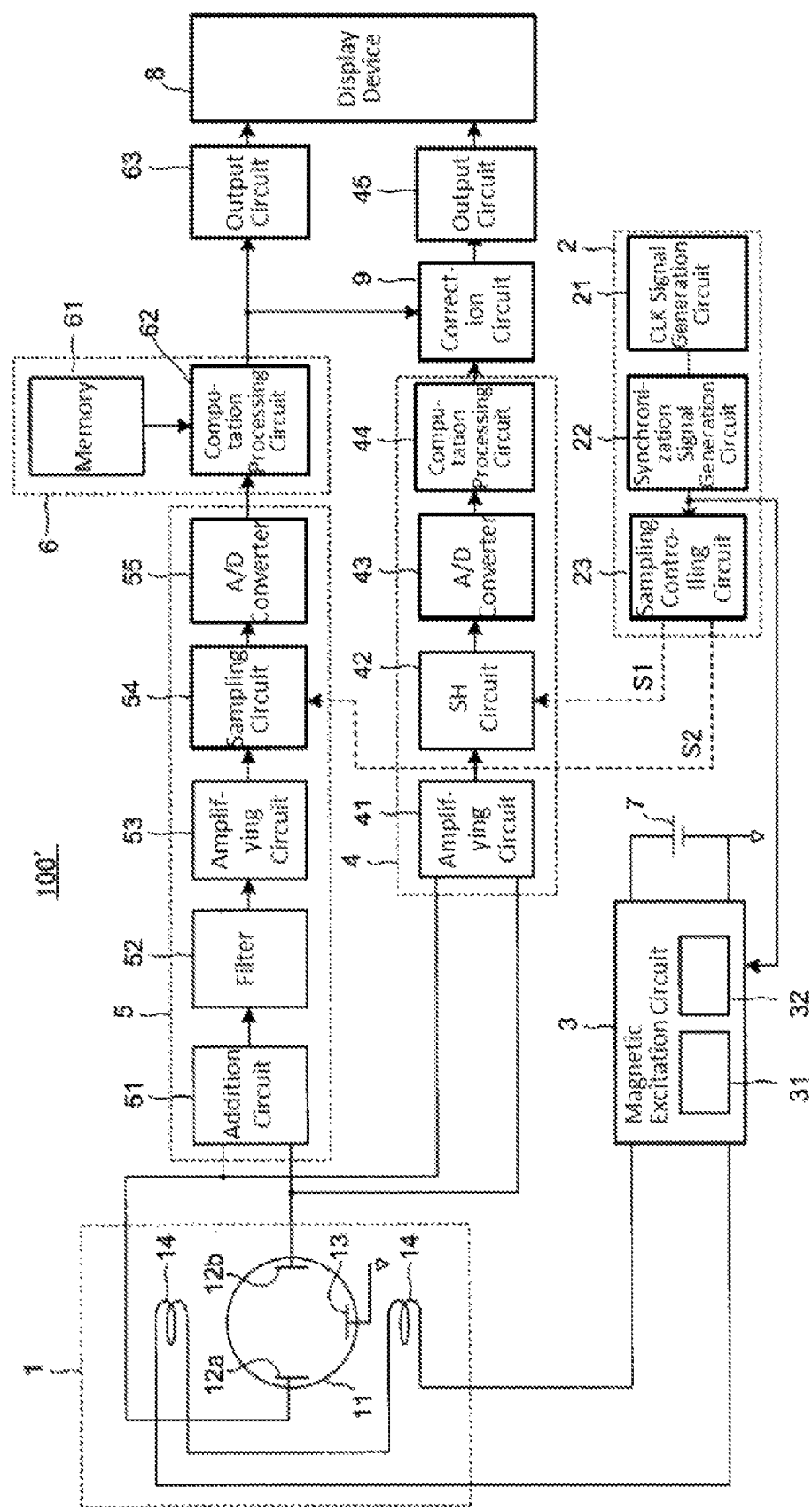
FIG. 4 illustrates the structure of an electromagnetic flow meter according to a second embodiment of the invention.

An electromagnetic flow meter 100' according to the second embodiment has a correction circuit 9 that corrects the flow rate calculated by the flow rate calculation circuit 4 based on the index, calculated by the index calculation circuit 6, that indicates an error in the flow rate calculated by the flow rate calculation circuit 4, as illustrated in FIG. 4. The structures and operations of the detector 1, the synchronization circuit 2, the magnetic excitation circuit 3, the flow rate calculation circuit 4, the differential noise measurement circuit 5, and the index calculation circuit 6 are the same as in the electromagnetic flow meter 100 according to the first embodiment except that the electromagnetic flow meter 100' according to the second embodiment has the correction circuit 9.

The correction circuit 9 may comprise a microprocessor and a program that controls the operation of the microprocessor, as in the computation processing circuits 44 and 62.

The following method may be used as the flow rate correction method by the correction circuit 9.

For example, when the index calculation circuit 6 outputs, as the index indicating an error, the ratio between the level of the magnetic flux differential noise measured by the differential noise measurement circuit 5 during flow rate measurement and the level of the magnetic flux differential noise during calibration stored in the memory 61, the flow rate is corrected by multiplying the flow rate calculated by the flow rate calculation circuit 4 by a correction coefficient corresponding to the index calculated by the index calculation circuit 6.

At this time, to eliminate the effect of noise, the correction described above may be performed when the level of the magnetic flux differential noise measured by the differential noise measurement circuit 5 during flow rate measurement changes beyond a predetermined range (for example, ±3%) with respect to the level of the magnetic flux differential noise during calibration stored in the memory 61.

In addition, when the change falls within a certain range as a result of observation of the index calculated by the index calculation circuit 6 for a predetermined period, the correction coefficient for correcting the flow rate may be set.

As described above, since the electromagnetic flow meter 100' according to the embodiment corrects the flow rate according to the level of the magnetic flux differential noise even when measuring the flow rate of a fluid having conductivity and properties different from those of water, the precision of flow rate measurement can be further improved.

Third Embodiment

Next, the electromagnetic flow meter according to the third embodiment of the invention will be described with reference to FIG. 5 and FIG. 6. It should be noted here that the same components as in the electromagnetic flow meter according to the first embodiment are given the same reference numerals and duplicative detailed descriptions are omitted.

Figure 5:
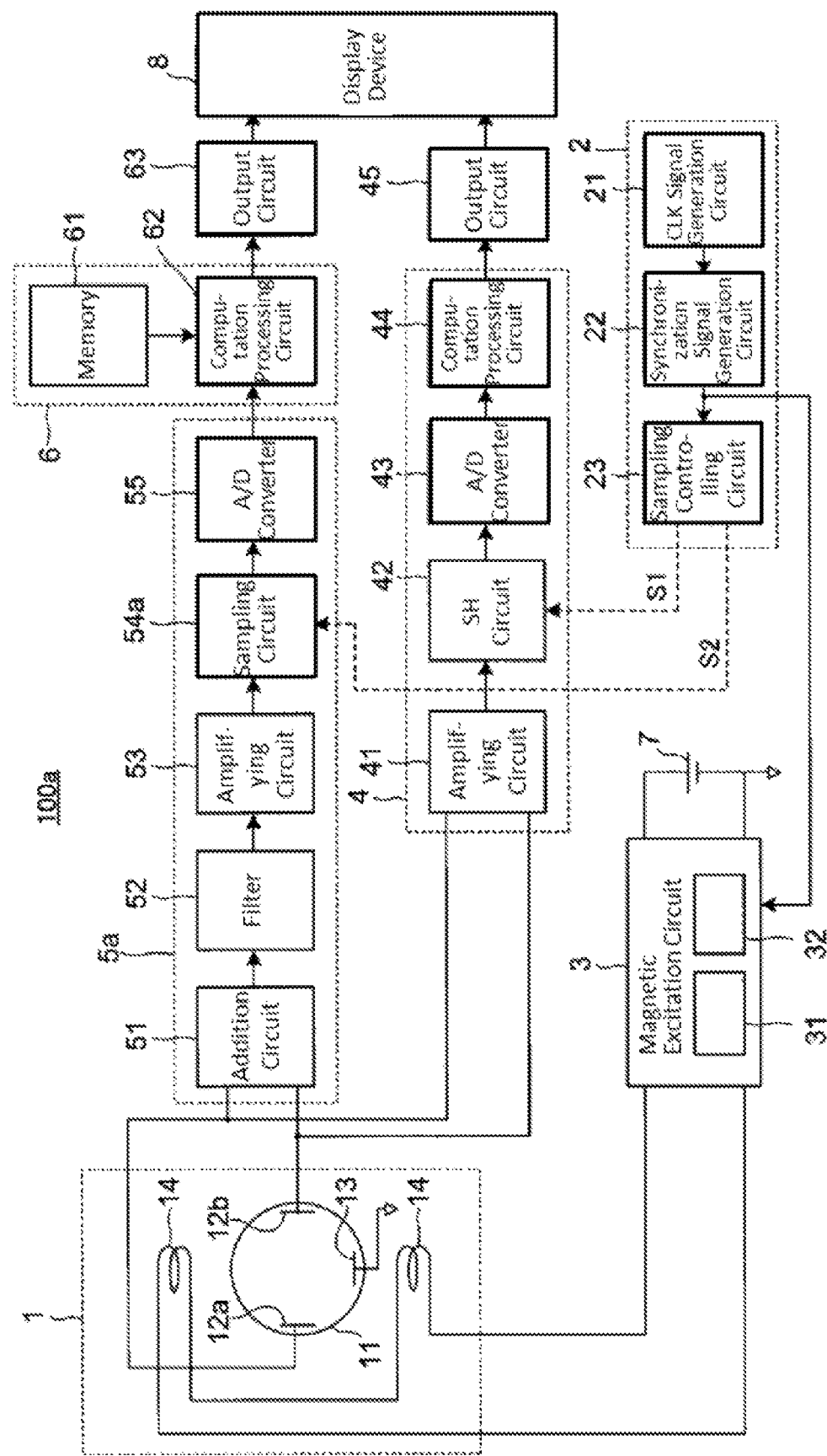
FIG. 5 illustrates the structure of an electromagnetic flow meter according to a third embodiment of the invention.

As illustrated in FIG. 5, the electromagnetic flow meter 100a according to the third embodiment has the same structure as the electromagnetic flow meter 100 according to the first embodiment except that the operation of the sampling circuit 54a differs in the following points.

Next, the operation of the sampling circuit 54a will be described. In the first embodiment, when the level of the magnetic flux differential noise is measured, the sampling circuit 54 samples an output in a predetermined period at the beginning of each of non-magnetic excitation periods including the magnetic flux differential noise of the output of the amplifying circuit 53. In contrast, in the third embodiment, the sampling circuit 54a is configured to sample a difference between the magnetic flux differential noise immediately after the positive magnetic excitation period switches to the non-magnetic excitation period and a value to which the magnetic flux differential noise is recognized to converge and a difference between the magnetic flux differential noise immediately after the negative magnetic excitation period switches to the non-magnetic excitation period and a value to which the magnetic flux differential noise is recognized to converge in the differential noise measurement circuit 5a that is a part of the error detection circuit.

Here, the "value to which the magnetic flux differential noise is recognized to converge" is the value of the magnetic flux differential noise in the state in which the magnetic flux differential noise that reduces over time has converged sufficiently, that is, the state in which change over time is very small. Although such a value is ideally zero, by taking exponential reduction in the magnetic flux density generated by the magnetic excitation coil 14, as illustrated in FIG. 6 (b), into consideration, when the ratio of the level of the magnetic flux differential noise to the initial level becomes a predetermined ratio (for example, 5%) with respect to the first level of the magnetic flux differential noise in the non-magnetic excitation period after the positive magnetic excitation period and the non-magnetic excitation period after the negative magnetic excitation period, the level of the magnetic flux differential noise may be the "level at which the magnetic flux differential noise is recognized to converge sufficiently".

Figure 6:
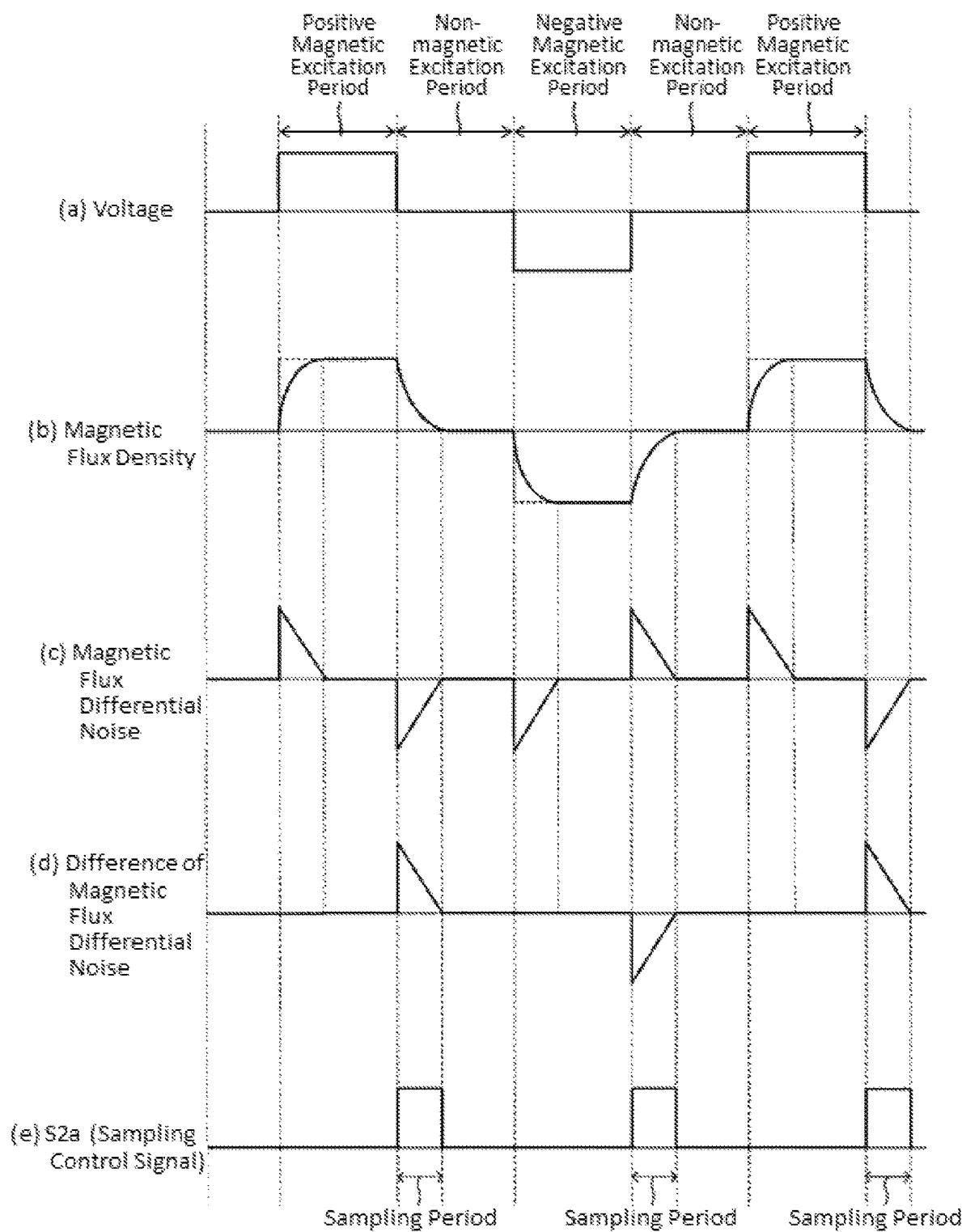
FIG. 6 is a timing chart used to describe the operation of the electromagnetic flow meter according to the third embodiment.

FIG. 6 illustrates the voltage (FIG. 6 (a)) applied to the magnetic excitation coil 14 by the magnetic excitation circuit 3, the magnetic flux density (FIG. 6 (b)) generated by the magnetic excitation coil 14, the magnetic flux differential noise (FIG. 6 (c)), the difference (FIG. 6 (d)) between the level of the magnetic flux differential noise in each of the non-magnetic excitation periods sampled by the sampling circuit 54a and the level at which the magnetic flux differential noise is recognized to converge sufficiently when the level at which the magnetic flux differential noise is recognized to converge sufficiently is zero, and the sampling signal (FIG. 6 (e)) associated with each other using a common time axis.

As illustrated in FIG. 6 (d), the signal sampled by the sampling circuit 54a has a polarity opposite to that of the magnetic flux differential noise illustrated in FIG. 6 (c) in the sampling periods illustrated in FIG. 6 (e).

The signal indicating the magnetic flux differential noise in the non-magnetic excitation period sampled by the sampling circuit 54a is converted to a digital signal by the A/D converter 55, the ratio between the level of this signal and the level of the magnetic flux differential noise during calibration is calculated by the index calculation circuit 6, and this value is output from the output circuit 63 as the index indicating an error in the flow rate calculated by the flow rate calculation circuit 4 of the electromagnetic flow meter 100a, as in the electromagnetic flow meter 100 of the first embodiment. This index is displayed in the display device 8.

INDUSTRIAL APPLICABILITY

The invention can be used as a technique for measuring the flow rate of a conductive fluid in various processes.

DESCRIPTION OF REFERENCE NUMERALS AND SIGNS 100, 100', 100a: electromagnetic flow meter; 1: detector; 11: measurement tube; 12a, 12b: detecting electrode; 13: ground ring; 14: magnetic excitation coil; 2: synchronization circuit; 21: CLK signal generation circuit; 22: synchronization signal generation circuit; 23: sampling controlling circuit; 3: magnetic excitation circuit, 31: voltage regulating circuit; 32: magnetic excitation current direction switching circuit; 4: flow rate calculation circuit; 41: amplifying circuit; 42: sample holding (SH) circuit; 43: A/D converter; 44: computation processing circuit; 45: output circuit; 5, 5a: differential noise measurement circuit; 51: addition circuit; 52: filter; 53: amplifying circuit; 54, 54a: sampling circuit; 55: A/D converter; 6: index calculation circuit; 61: memory; 62: computation processing circuit; 63: output circuit; 7: power supply; 8: display device; 9: correction circuit

The invention claimed is:

1. An error detection circuit for an electromagnetic flow meter that comprises a detector having a measurement tube, a magnetic excitation coil for generating a magnetic field orthogonal to a longitudinal direction of the measurement tube, and a pair of detecting electrodes disposed in the measurement tube, the detecting electrodes facing each other in a direction orthogonal to a flow direction of a fluid and a direction of the magnetic field, a magnetic excitation circuit that periodically supplies magnetic excitation current to the magnetic excitation coil while changing a direction of the magnetic excitation current and providing a non-magnetic excitation period between a positive magnetic excitation period and a negative magnetic excitation period, and a flow rate calculation circuit that calculates a flow rate of the fluid flowing through the measurement tube based on an electromotive force generated between the pair of detecting electrodes when the magnetic excitation current flows through the magnetic excitation coil, the error detection circuit comprising:
a differential noise measurement circuit configured to measure a level of a magnetic flux differential noise from an electromotive force generated between the pair of detecting electrodes; and
an index calculation circuit configured to calculate an index indicating an error in the flow rate calculated by the flow rate calculation circuit of the electromagnetic flow meter based on the level of the magnetic flux differential noise measured by the differential noise measurement circuit.

2. The error detection circuit according to claim 1, wherein the differential noise measurement circuit comprises:
an addition circuit that adds voltages of the pair of detecting electrodes,
a sampling circuit that samples an output of the addition circuit in a predetermined period at a beginning of the non-magnetic excitation period, and
an A/D converter that performs analog-to-digital conversion of an output of the sampling circuit, and
wherein the index calculation circuit comprises:
a memory that stores a calibration level of the magnetic flux differential noise during calibration of the electromagnetic flow meter, and
a computation processing circuit that calculates the index indicating the error in the flow rate calculated by the flow rate calculation circuit based on an output of the A/D converter and the calibration level of the magnetic flux differential noise stored in the memory.

3. The error detection circuit according to claim 2, wherein the sampling circuit samples an output of the magnetic flux differential noise immediately after the positive magnetic excitation period switches to the non-magnetic excitation period and another output of the magnetic flux differential noise immediately after the negative magnetic excitation period switches to the non-magnetic excitation period.

4. The error detection circuit according to claim 2, wherein the sampling circuit samples a difference between an output of the magnetic flux differential noise immediately after the positive magnetic excitation period switches to the non-magnetic excitation period and a first value to which the magnetic flux differential noise is recognized to converge, and samples a difference between another output of the magnetic flux differential noise immediately after the negative magnetic excitation period switches to the non-magnetic excitation period and a second value to which the magnetic flux differential noise is recognized to converge.

5. The error detection circuit according to claim 2, further comprising:
a sampling controlling circuit that causes the sampling circuit to sample an output of the magnetic flux differential noise immediately after the positive magnetic excitation period switches to the non-magnetic excitation period and another output of the magnetic flux differential noise immediately after the negative magnetic excitation period switches to the non-magnetic excitation period.

6. The error detection circuit according to claim 2, wherein the computation processing circuit calculates, as the index, a ratio of the output of the A/D converter to the calibration level of the magnetic flux differential noise stored in the memory.

7. The error detection circuit according to claim 1, further comprising:
an output circuit that outputs the index calculated by the index calculation circuit.

8. An electromagnetic flow meter comprising:
a detector that has a measurement tube, a magnetic excitation coil that generates a magnetic field orthogonal to a longitudinal direction of the measurement tube, and a pair of detecting electrodes disposed in the measurement tube, the detecting electrodes facing each other in a direction orthogonal to a flow direction of a fluid and a direction of the magnetic field;
a magnetic excitation circuit that periodically supplies magnetic excitation current to the magnetic excitation coil while changing a direction of the magnetic excitation current and providing a non-magnetic excitation period between a positive magnetic excitation period and a negative magnetic excitation period;
a flow rate calculation circuit that calculates a flow rate of the fluid flowing through the measurement tube based on an electromotive force generated between the pair of detecting electrodes when the magnetic excitation current flows through the magnetic excitation coil; and an error detection circuit configured to calculate an index indicating an error in the flow rate calculated by the flow rate calculation circuit of the electromagnetic flow meter based on a level of a magnetic flux differential noise measured from an electromotive force generated between the pair of detecting electrodes, wherein the error detection circuit comprises:

a differential noise measurement circuit configured to measure the level of the magnetic flux differential noise from the electromotive force generated between the pair of detecting electrodes; and an index calculation circuit configured to calculate the index based on the level of the magnetic flux differential noise measured by the differential noise measurement circuit.

9. The electromagnetic flow meter according to claim 8, further comprising:

a correction circuit that corrects the flow rate based on the index indicating the error in the flow rate calculated by the flow rate calculation circuit, the index being calculated by the index calculation circuit.

10. The electromagnetic flow meter according to claim 8, further comprising:

a displaying portion that displays the index indicating the error in the flow rate calculated by the flow rate calculation circuit, the index being calculated by the index calculation circuit.

11. An error detection method for an electromagnetic flow meter that comprises a detector having a measurement tube, a magnetic excitation coil for generating a magnetic field orthogonal to a longitudinal direction of the measurement tube, and a pair of detecting electrodes disposed in the measurement tube, the detecting electrodes facing each other in a direction orthogonal to a flow direction of a fluid and a direction of the magnetic field, a magnetic excitation circuit that periodically supplies magnetic excitation current to the magnetic excitation coil while changing a direction of the magnetic excitation current and providing a non-magnetic excitation period between a positive magnetic excitation period and a negative magnetic excitation period, and a flow rate calculation circuit that calculates a flow rate of the fluid flowing through the measurement tube based on an electromotive force generated between the pair of detecting electrodes when the magnetic excitation current flows through the magnetic excitation coil, the error detection method comprising:

measuring a level of a magnetic flux differential noise included in an electromotive force generated between the pair of detecting electrodes; and calculating an index indicating an error in the flow rate calculated by the flow rate calculation circuit of the electromagnetic flow meter based on the measured level of the magnetic flux differential noise; and correcting the flow rate calculated by the flow rate calculation circuit based on the index.

* * * * *